ered.
UNITED STATES PATENT OFFICE.

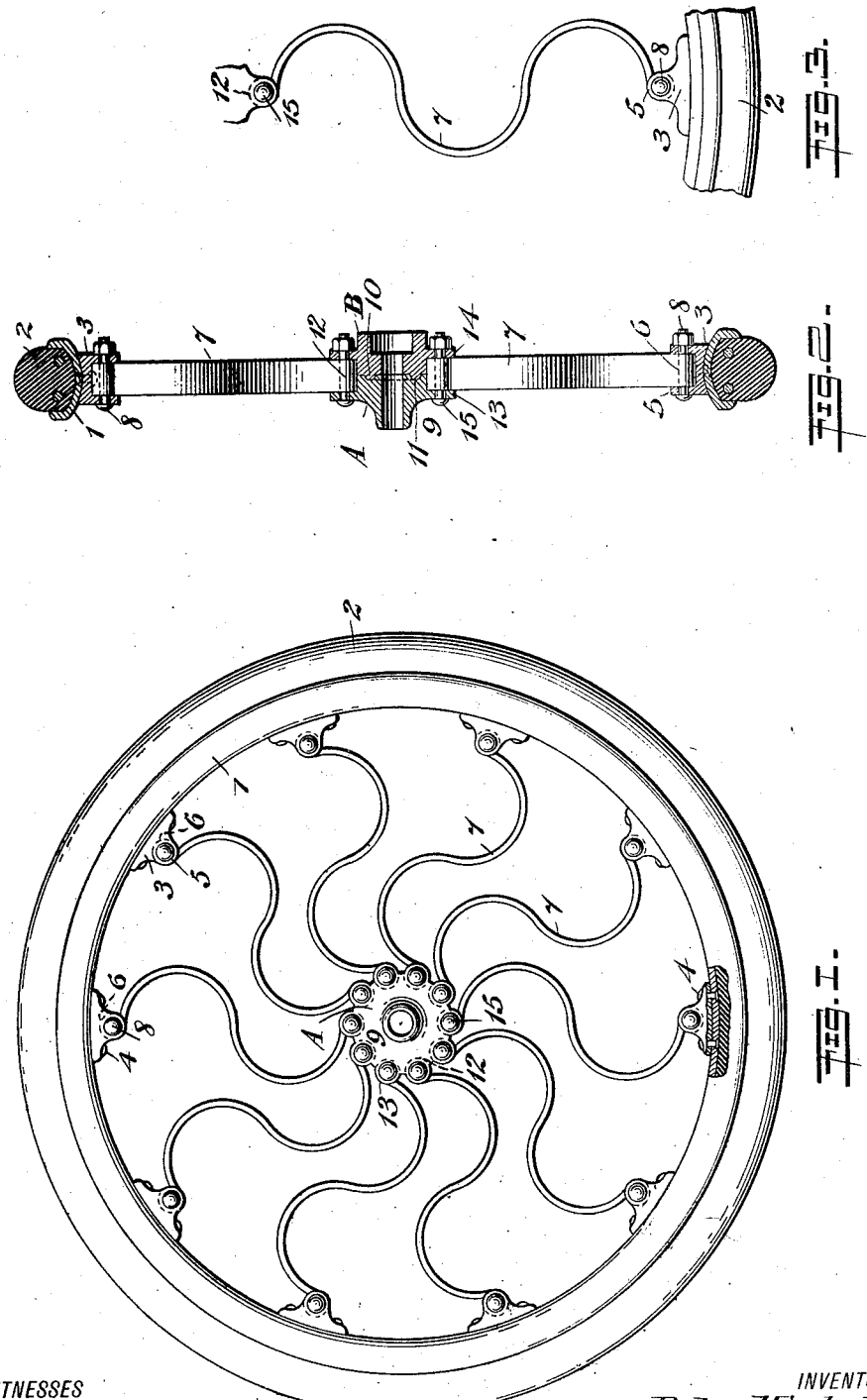

PETER HINKEL, OF ASHLAND, KENTUCKY.

SPRING-SPOKE WHEEL.

1,121,501.      Specification of Letters Patent.      Patented Dec. 15, 1914.

Application filed February 4, 1914. Serial No. 816,471.

*To all whom it may concern:*

Be it known that I, PETER HINKEL, a citizen of the United States, and a resident of Ashland, in the county of Boyd and State of Kentucky, have invented a new and Improved Spring-Spoke Wheel, of which the following is a full, clear, and exact description.

This invention relates to vehicle wheels of that type in which the spokes are made of springs, so that solid rubber tires or equivalent tread elements may be employed and still provide a resiliency which for all practical purposes is as satisfactory as that afforded by the pneumatic tires, but without the disadvantages of the latter, as to cost, high up-keep charges, liability to accidents, etc.

The general objects of the present invention are to improve and simplify the construction of spring spoke wheels so as to be reliable and efficient in use, comparatively inexpensive to manufacture, and of durable and substantial design.

Another object of the invention is the provision of a wheel having spring spokes of the corrugated type which are hingedly connected with the hub and rim of the wheel, the hub being of novel construction, in that it is made of parts interfitting and receiving the inner ends of the spokes which are pivotally bolted thereto, the bolts serving to hold the parts of the hub together.

With such objects in view, and others which will appear as the description proceeds, the invention comprises various novel features of construction and arrangement of parts, such as will be set forth with particularity in the following description and claim appended hereto.

In the accompanying drawing, which illustrates certain embodiments of the invention, and wherein similar characters of reference indicate corresponding parts in all the views, Figure 1 is a side view of the spring spoke wheel, with a portion broken away; Fig. 2 is a vertical section taken through the axis of the wheel; and Fig. 3 is a modified form of spoke.

Referring to the drawing, 1 designates the rim or felly of the wheel which is of any desired construction, that shown being of channel cross-section so as to form a groove or seat for the solid rubber tire 2, although it is to be understood that a metal tire or tread element may be employed. On the inner face of the rim 1 are a plurality of brackets 3 suitably spaced apart and fastened in place by rivets 4, each bracket having a pair of spaced lugs 5 between which the outer ends or eyes 6 of the spokes 7 fit. Passing through the eyes 6 of the spokes and through the lugs 5 of the brackets 3 are bolts 8 which serve to hingedly fasten the spokes to the rim.

The hub 9 is made in two sections A and B separable on a plane transverse to the axis of the hub, and one section has an annular tongue 10 which fits into a correspondingly shaped groove 11, whereby the two sections interlock and are kept in concentric relation. By making the hub in two sections the spring spokes 7 are easily connected therewith. The inner ends of the spokes are formed into eyes 12 which fit between flanges 13 and 14 on the sections A and B, respectively, and through these eyes and flanges pass bolts 15 that form not only pivotal connections between the spokes and hub, but serve to fasten the sections of the hub together. The spokes 7 are made of flat strip spring metal corrugated. The spokes may have two oppositely disposed corrugations as shown in Fig. 1, or more, as shown in Fig. 3. By means of these spokes the hub can occupy a position eccentric to the felly and thereby resiliently support the vehicle or load placed on the hub. The spokes under the hub are subjected to compression while those over the hub are under expansion, and at the same time the hub is free to yield in a horizontal plane when blows are imparted to the felly.

From the foregoing description taken in connection with the accompanying drawings, the advantages of the construction and method of operation will be readily understood by those skilled in the art to which the invention appertains, and while I have described the device which I now consider to be the best embodiment thereof, I desire to have it understood that the device shown is merely illustrative, and that such changes may be made when desired as are within the scope of the appended claim.

Having thus described my invention, I claim as new and desire to secure by Letters Patent:

In a wheel, a hub composed of two sections separable on a plane transverse to the axis thereof, and one section having a groove and the other a tongue arranged to enter the groove, peripheral flanges, one on each section, whereby an annular groove is provided around the hub at a point beyond the said tongue and groove above referred to, radially disposed sinoidal spokes having eyes disposed in said annular groove and each eye being of such dimension as to extend from one peripheral flange to the other, whereby relative lateral movement of the inner ends of the spokes and hub is prevented, bolts passing through flanges and the annular groove and through the eyes of the spokes for fastening the two sections of the hub together, with the tongue of one section entered in the groove of the other section and serving to fasten the spokes to the hub, a rim, and pivotal connections between the rim and outer ends of the spokes.

In testimony whereof I have signed my name to this specification in the presence of two subscribing witnesses.

PETER HINKEL.

Witnesses:
J. H. BRERELETTE,
P. J. KELLEY.